(12) United States Patent
Rahman et al.

(10) Patent No.: US 9,379,586 B2
(45) Date of Patent: Jun. 28, 2016

(54) BAR WOUND STATOR WINDING LAYOUT WITH LONG-PITCHED AND SHORT-PITCHED COILS

(71) Applicant: GM GLOBAL TECHNOLOGY OPERATIONS LLC, Detroit, MI (US)

(72) Inventors: Khwaja M. Rahman, Troy, MI (US); Sinisa Jurkovic, Sterling Heights, MI (US); Peter J. Savagian, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 583 days.

(21) Appl. No.: 13/869,305

(22) Filed: Apr. 24, 2013

(65) Prior Publication Data

US 2014/0319953 A1 Oct. 30, 2014

(51) Int. Cl.
  *H02K 3/28* (2006.01)
  *H02K 3/12* (2006.01)
  *H02K 3/04* (2006.01)

(52) U.S. Cl.
  CPC .. *H02K 3/28* (2013.01); *H02K 3/04* (2013.01); *H02K 3/12* (2013.01)

(58) Field of Classification Search
  CPC .............. H02K 3/28; H02K 3/04; H02K 3/12
  USPC .................................................. 310/198, 201
  IPC ......................................................... H02K 3/28
  See application file for complete search history.

(56) References Cited

U.S. PATENT DOCUMENTS

| | | | | |
|---|---|---|---|---|
| 6,137,201 A * | 10/2000 | Umeda | .................. | H02K 1/165 310/179 |
| 6,201,332 B1 * | 3/2001 | Umeda | .................... | H02K 3/12 310/179 |
| 6,459,186 B1 * | 10/2002 | Umeda | .................. | H02K 1/165 310/208 |
| 6,894,417 B2 | 5/2005 | Cai et al. | | |
| 6,979,926 B2 * | 12/2005 | Ogawa | ..................... | H02K 3/12 310/179 |
| 7,170,211 B2 * | 1/2007 | Chen | ......................... | H02K 3/12 310/184 |
| 7,242,124 B2 * | 7/2007 | Ogawa | ..................... | H02K 3/12 310/179 |
| 7,622,843 B2 | 11/2009 | Cai | | |
| 2001/0040416 A1 | 11/2001 | Nakamura et al. | | |
| 2006/0033394 A1 * | 2/2006 | Ogawa | ..................... | H02K 3/12 310/179 |
| 2009/0140596 A1 | 6/2009 | Kaiser et al. | | |
| 2014/0319953 A1 * | 10/2014 | Rahman | .................. | H02K 3/28 310/198 |

FOREIGN PATENT DOCUMENTS

CN 102882338 A 1/2013

* cited by examiner

*Primary Examiner* — John K Kim
(74) *Attorney, Agent, or Firm* — Quinn Law Group, PLLC (57) ABSTRACT

A stator assembly includes a plurality of stator slots defining a plurality of slot layers. The assembly includes a plurality of hairpins each having respective first and second legs positioned in respective ones of the slot layers. Each of the hairpins is one of a short-pitched coil, a long-pitched coil and a full-pitched coil. The short-pitched, long-pitched and full-pitched coils are configured to extend over a first, second and third number of the stator slots, respectively. The hairpins may be divided into first, second, third, fourth, fifth and sixth hairpin layers. One of the hairpin layers includes at least one short-pitched coil, and another of the hairpin layers includes at least one long-pitched coil. The first, third and fifth hairpin layers each may include at least two short-pitched coils while the second, fourth and sixth hairpin layers each may include at least two long-pitched coils.

16 Claims, 4 Drawing Sheets

BAR WOUND STATOR WINDING LAYOUT WITH LONG-PITCHED AND SHORT-PITCHED COILS

TECHNICAL FIELD

The disclosure relates generally to a stator assembly in an electric machine, and more particularly, to the winding layout in a bar-wound stator assembly.

BACKGROUND

An electric machine includes a rotor assembly that is rotatable relative to a stator assembly. The stator assembly generally includes a plurality of stator windings inserted into slots in the stator assembly. A bar wound stator assembly is sometimes employed in electric machines to improve machine thermal and overall performance. Typical bar wound construction uses slot liners around the slots and between conductors. Eliminating the slot liner that is placed between conductors within a stator slot would improve copper slot fill and hence efficiency of the machine. However, the absence of conductor-to-conductor slot liners may expose the conductors to non-preferred voltage potentials (between conductors) within the stator slot.

SUMMARY

A stator assembly includes a plurality of stator slots defining a plurality of slot layers. The assembly includes a plurality of conductors or hairpins each having a respective first leg positioned in one of the slot layers and a respective second leg positioned in another of the slot layers. For bar wound construction, the conductor is typically referred to as a "hairpin" by those skilled in the art and will be referred to as such in this description. Each of the hairpins (the term "hairpins" is intended to refer to "the plurality of hairpins") is configured to allow a current flow from the respective first leg to the respective second leg. Each of the hairpins is one of a short-pitched coil, a long-pitched coil and a full-pitched coil. The short-pitched, long-pitched and full-pitched coils are configured to extend over a first, second and third number of the plurality of stator slots, respectively. The first number is less than the second number and the third number is between the first and second numbers. In one example, the first, second and third numbers are 8, 10 and 9, respectively. In another example, the first, second and third numbers are 5, 7 and 6, respectively.

The plurality of slot layers may include first, second, third, fourth, fifth and sixth slot layers. The hairpins may be divided into first, second, third, fourth, fifth and sixth hairpin layers. The winding layout for the stator assembly may be such that: (a) one of the hairpin layers includes at least one short-pitched coil; (b) another of the hairpin layers includes at least one long-pitched coil. The winding layout may be such that: (a) the first, third and fifth hairpin layers each include at least two short-pitched coils; and (b) the second, fourth and sixth hairpin layers each include at least two long-pitched coils. The first, second, third, fourth, fifth and sixth hairpin layers each may include at least one full-pitched coil.

The winding layout is configured to lower voltages between the respective hairpins within each stator slot. Combining the use of short-pitched and long pitched coils within the same winding layout, in the manner described below, leads to a reduction of voltages between the respective hairpins within each stator slot. The winding layout may lower the in-slot voltages between hairpins by approximately 35%. Lowering voltages between the respective hairpins within each stator slot allows for the elimination of hairpin-to-hairpin slot liners. Thus the stator assembly may be characterized by an absence of respective hairpin-to-hairpin slot liners between the hairpins. This improves copper slot fill, lowers energy losses and improves the efficiency of the machine, lowers cost, and reduces manufacturing complexity. However, it is to be appreciated that the winding layout may be employed either with or without hairpin-to-hairpin slot liners.

The plurality of hairpins form first, second and third winding sets. Each of the first, second and third winding sets may be parallel to one another. The first winding set may be formed by hairpins from the first and second hairpin layers. The second winding set may be formed by hairpins from the third and fourth hairpin layers. The third winding set may be formed by hairpins from the fifth and sixth hairpin layers.

In one example, the first winding set may include 12 hairpins from the first hairpin layer connected in series with 12 hairpins from the second hairpin layer. The second winding set may include 12 hairpins from the third hairpin layer connected in series with 12 hairpins from the fourth hairpin layer. The third winding set may include 12 hairpins from the fifth hairpin layer connected in series with 12 hairpins from the sixth hairpin layer. Each of the first, second and third winding sets may define an identical number of multiple phases. In one embodiment, the multiple phases is exactly three phases; the plurality of stator slots includes exactly 72 slots; and the stator defines 8 poles.

A first set of three adjacent slots of the stator slots is configured to accommodate the hairpins carrying current with a first phase. For example, all of the first, second, third, fourth, fifth and sixth slot layers in the $19^{th}$, $20^{th}$ and $21^{st}$ stator slots may carry current with phase U. A second set of three adjacent slots of the stator slots is configured to accommodate the hairpins carrying current with a second phase. For example, all of the first, second, third, fourth, fifth and sixth slot layers in the $22^{nd}$, $23^{rd}$ and $24^{th}$ stator slots may carry current with phase V. A third set of three adjacent slots of the stator slots is configured to accommodate the hairpins carrying current with a third phase. For example, all of the first, second, third, fourth, fifth and sixth slot layers in the $25^{th}$, $26^{th}$ and $27^{th}$ stator slots may carry current with phase W.

The first hairpin layer may be defined by hairpins with the respective first leg in the first slot layer and the respective second leg in the second slot layer. The second hairpin layer may be defined by the plurality of hairpins with the respective first leg in the second slot layer and the respective second leg in the first slot layer. The third hairpin layer may be defined by the plurality of hairpins with the respective first leg in the third slot layer and the respective second leg in the fourth slot layer. The fourth hairpin layer may be defined by the plurality of hairpins with the respective first leg in the fourth slot layer and the respective second leg in the third slot layer. The fifth hairpin layer may be defined by the plurality of hairpins with the respective first leg in the fifth slot layer and the respective second leg in the sixth slot layer. The sixth hairpin layer may be defined by the plurality of hairpins with the respective first leg in the sixth slot layer and the respective second leg in the fifth slot layer.

The above features and advantages and other features and advantages of the present invention are readily apparent from the following detailed description of the best modes for carrying out the invention when taken in connection with the accompanying drawings.

DETAILED DESCRIPTION

Figure 1:
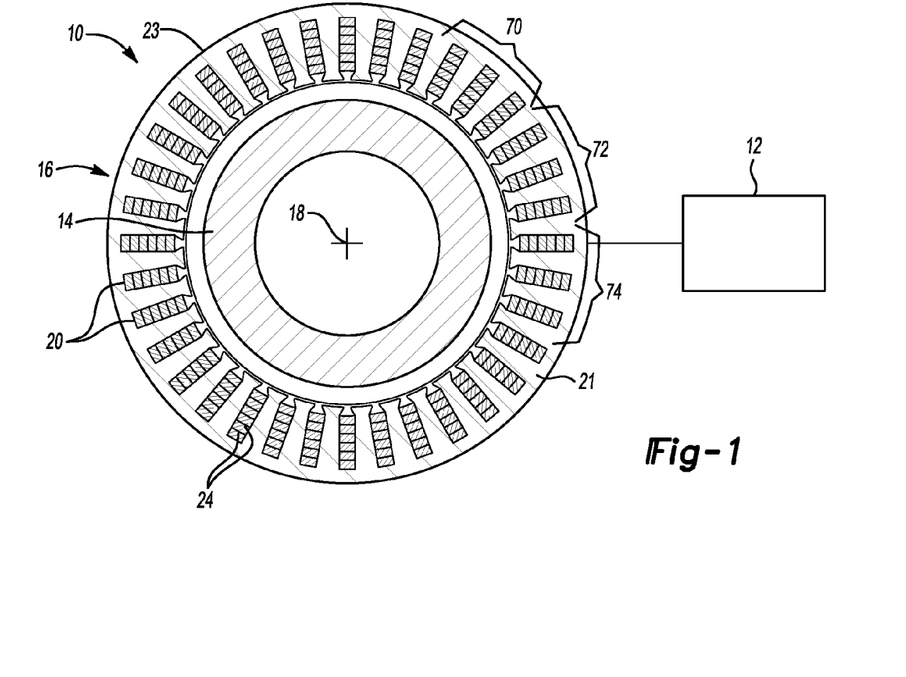
FIG. 1 is a schematic fragmentary sectional view of an electric machine with a stator assembly having multiple winding sets.

Referring to the Figures, wherein like reference numbers refer to the same or similar components throughout the several views, FIG. 1 is a schematic fragmentary sectional view of an electric motor/generator or electric fraction machine, referred to herein as electric machine 10. The electric machine 10 may be employed in a vehicle 12. The vehicle 12 may be any passenger or commercial automobile such as a hybrid electric vehicle including a plug-in hybrid electric vehicle, an extended range electric vehicle, or other vehicles. The electric machine 10 may include any device configured to generate an electric machine torque by, for example, converting electrical energy into rotational motion. For instance, the electric machine 10 may be configured to receive electrical energy from a power source, such as a battery array (not shown). The power source may be configured to store and output electrical energy. The vehicle 12 may include an inverter (not shown) for converting the DC voltage from the battery array into alternating current (AC) voltage. The electric machine 10 may be configured to use the AC voltage from the inverter to generate rotational motion. The electric machine 10 may be further configured to generate electrical energy when provided with a torque at speeds, such as the engine torque (mechanical energy).

Referring to FIG. 1, the electric machine 10 includes a rotor assembly 14 and a stator assembly 16. The rotor assembly 14 is rotatable relative to and within the stator assembly 16 about a longitudinal axis 18 (extending out of the page in FIG. 1). The rotor assembly 14 may be annularly-shaped and positioned around a shaft (not shown). The rotor assembly 14 may be of any type known to those skilled in the art, including but not limited to, an interior permanent magnet, a surface permanent magnet, an induction, synchronous, reluctance or a separately-excited/wound-field rotor. The specific configuration of the rotor assembly 14 is not shown in FIG. 1.

Referring to FIG. 1, the stator assembly 16 includes a plurality of stator slots 20 extending away from a stator core 21. The stator slots 20 may extend lengthwise along the longitudinal axis 18 and may be evenly spaced from each other radially about the longitudinal axis 18. The stator assembly 16 may include any number of slots or poles suitable to the application at hand. In one example, the number of stator slots 20 is exactly 72 (FIG. 1 is intended as a schematic illustration only) and the stator assembly 16 defines 8 poles.

Figure 2:
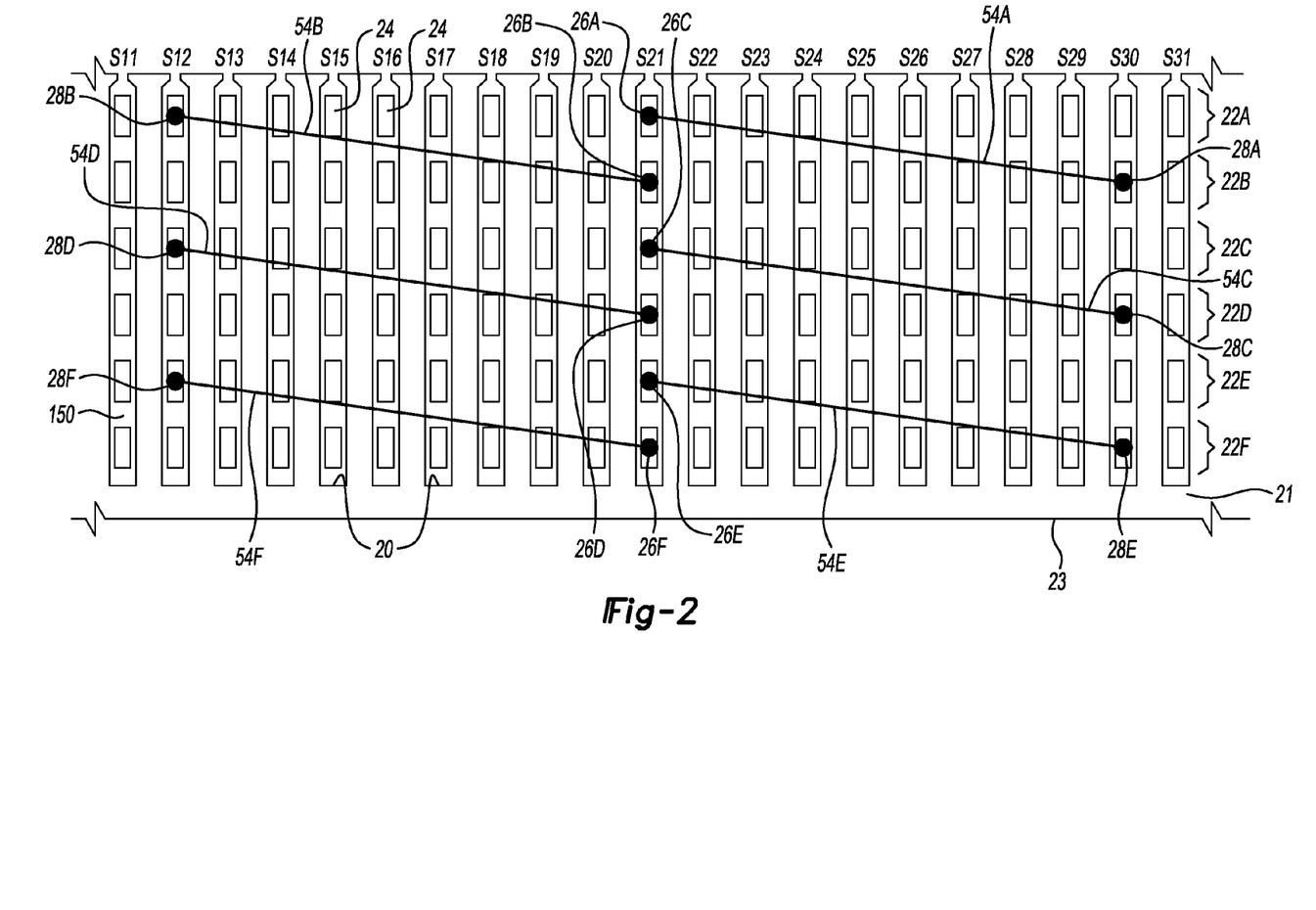
FIG. 2 is a schematic fragmentary sectional view of the stator assembly of FIG. 1.

FIG. 2 is a schematic fragmentary sectional view of the stator assembly 16. In the embodiment shown, the stator assembly 16 includes 72 slots. FIG. 2 shows stator slot numbers S11 through S31. Referring to FIG. 2, the plurality of stator slots 20 may define first, second, third, fourth, fifth and sixth slot layers 22A, B, C, D, E and F. Referring to FIG. 2, the first slot layer 22A is farthest from the outer diameter 23 of the stator core 21 and the sixth slot layer 22F is closest to the outer diameter 23 of the stator core 21. However, it should be appreciated that each stator slot 20 may include a different number of layers, including but not limited to, four layers or eight layers. Referring to FIGS. 1-2, the stator slots 20 may be partially open slots or closed slots.

Figure 3:
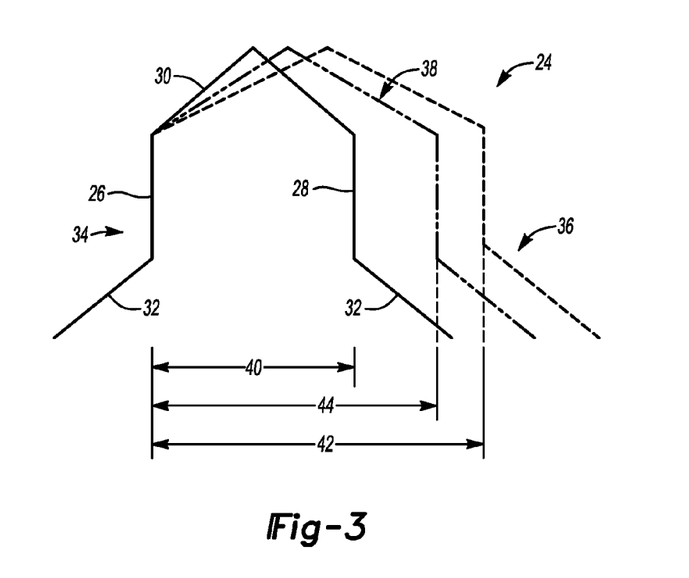
FIG. 3 is a schematic perspective view of hairpins that may be employed in the stator assembly of FIG. 1.

Referring to FIGS. 1-2, the stator assembly 16 includes a plurality of conductors or hairpins 24. For bar wound construction, the conductor is typically referred to as a "hairpin" by those skilled in the art and will be referred to as such in this description. FIG. 3 is a schematic diagram of three types of conductors or hairpins 24 that may be employed in the stator assembly 16. It is understood that the hairpins 24 shown in FIG. 3 are only schematic, and are not meant to represent the scale or specific shape of the hairpins 24 as is known to those skilled in the art. Referring to FIGS. 1-2, the hairpins 24 may include a substantially rectangular cross-section. However, any other cross-sectional shape may be employed.

Referring to FIG. 3, the hairpins 24 are segmented and include a respective first leg 26, a respective second leg 28 and a respective bent end portion 30 between the respective first and second legs 26, 28. The hairpins 24 are configured to allow a current to flow from the respective first leg 26 to the respective second leg 28. Referring to FIG. 3, after being inserted into the stator slot 20, the ends 32 of the hairpins 24 are bent outward to enable connections between respective hairpins 24 by welding.

Referring to FIG. 3, three types of hairpins 24 are shown: a short-pitched coil 34, a long-pitched coil 36 and a full-pitched coil 38. Referring to FIG. 3, the short-pitched coil 34 has a first span 40, the long-pitched coil 36 has a second span 42 and the full-pitched coil 38 has a third span 44. The span of the hairpin 24 may be defined as the angular distance between stator slots 20 through which a single hairpin 24 is positioned. As shown in FIG. 3, the second span 42 is greater than the first span 40. The third span 44 is greater than the first span 40 and less than the second span 42.

Stated differently, each hairpin 24 spans a pre-determined number of stator slots 20. The short-pitched, long-pitched and full-pitched coils 34, 36, 38 are configured to extend over a first, second and third number of the plurality of stator slots 20, respectively. The first number is less than the second number and the third number is between the first and second numbers. That is, the first number is the least and the second number is the greatest of the first, second and third numbers. In one example, the first, second and third numbers are 8, 10 and 9 slots, respectively. In this example, the number of stator slots 20 may be 72, the stator assembly 16 may define 8 poles and have a three-slot distribution (i.e., where every three of the stator slots 20 occupies the same phase). In another example, the first, second and third numbers are 5, 7 and 6 slots, respectively. In this example, the number of stator slots 20 may be 48, the stator assembly 16 may define 8 poles and have a two-slot distribution (i. e., where every three of the stator slots 20 occupies the same phase).

Referring now to FIG. 2, the hairpins 24 each have their respective first leg 26 inserted into one of the first, second, third, fourth, fifth and sixth slot layers 22A-E and their respective second leg 28 inserted into another of the first, second, third, fourth, fifth and sixth slot layers 22A-E. The hairpins 24 may be divided into first, second, third, fourth, fifth and sixth hairpin layers 54A-E, shown in FIG. 2 (and FIGS. 4-5). The lines in FIG. 2 representing hairpin layers 54A-E are only schematic, and are not meant to represent the scale or specific shape of the hairpins 24 as is known to those skilled in the art.

Referring to FIG. 2, the first hairpin layer 54A (forward winding from first to second slot layer 22A to 22B) is formed by the plurality of hairpins 24 having their first leg 26A in the first slot layer 22A (e.g. in slot S21) and their second leg 28A in the second slot layer 22B (e.g. in slot S30). In other words, the first hairpin layer 54A is the forward winding from the first to second slot layers 22A to 22B. Referring to FIG. 2, the second hairpin layer 54B is defined by the plurality of hairpins 24 having their first leg 26B in the second slot layer 22B (e.g. in slot S21) and their second leg 28B in the first slot layer 22A (e.g. in slot S12). In other words, the second hairpin layer 54B is the reverse winding from the second to first slot layers 22B to 22A.

Referring to FIG. 2, the third hairpin layer 54C is defined by the plurality of hairpins 24 with their first leg 26C in the third slot layer 22C (e.g. in slot S21) and their second leg 28C in the fourth slot layer 22D (e.g. in slot S30). In other words, the third hairpin layer 54C is the forward winding from the third to fourth slot layers 22C to 22D. Referring to FIG. 2, the fourth hairpin layer 54D is defined by the plurality of hairpins 24 with their first leg 26D in the fourth slot layer 22D (e.g. in slot S21) and their second leg 28D in the third slot layer 22C (e.g. in slot S12). In other words, the fourth hairpin layer 54D is the reverse winding from the fourth to third slot layers 22D to 22C.

Referring to FIG. 2, the fifth hairpin layer 54E is defined by the plurality of hairpins 24 with their first leg 26E in the fifth slot layer 22E (e.g. in slot S21) and their second leg 28E in the sixth slot layer 22F (e.g. in slot S30). In other words, the fifth hairpin layer 54E is the forward winding from the fifth to sixth slot layers 22E to 22F. Referring to FIG. 2, the sixth hairpin layer 54F is defined by the plurality of hairpins 24 with their first leg 26F in the sixth slot layer 22F (e.g. in slot S21) and their second leg 28F in the fifth slot layer 22E (e.g. in slot S12). In other words, the sixth hairpin layer 54F is the reverse winding from the sixth to fifth slot layers 22F to 22E.

Figure 4:
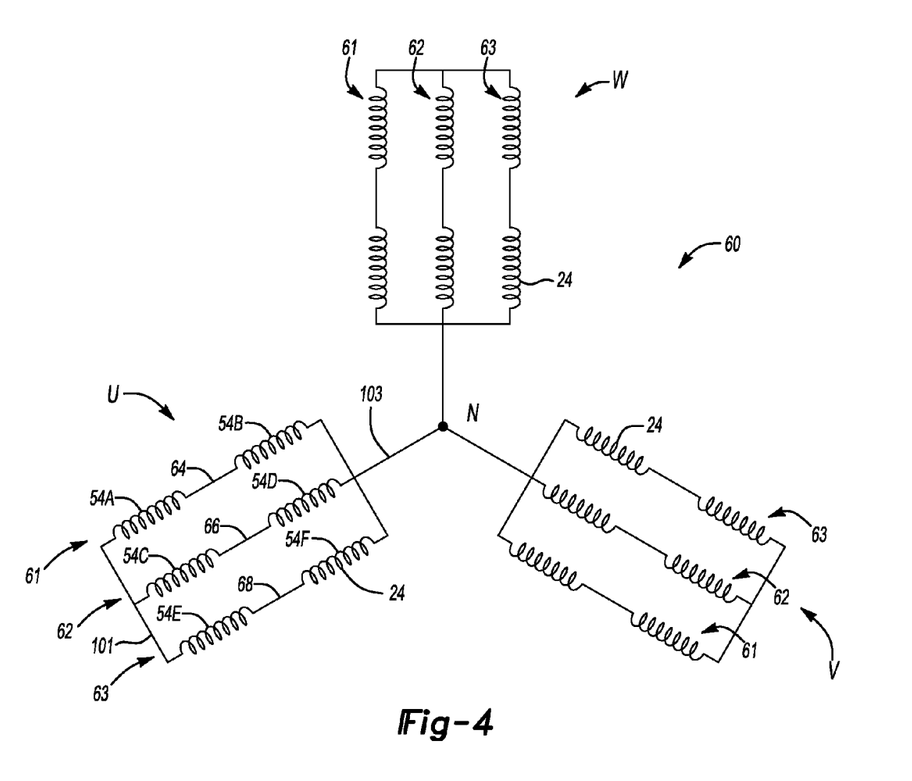
FIG. 4 is a schematic diagram of electrical connections between the winding sets in the stator assembly of FIG. 1.

FIG. 4 is a schematic diagram of an embodiment of the electrical connections 60 of the stator assembly 16. The hairpins 24 form first, second and third winding sets 61, 62, 63 (shown in FIG. 4) within the stator slots 20 (shown in FIGS. 1-2). The stator assembly 16 may include any number of winding sets as required according to the particular application at hand.

Each of the first, second and third winding sets 61, 62, 63 may define an identical number of multiple phases. In one embodiment, the number of multiple phases is exactly three, for example, each winding set 61, 62, 63 defines a "U" phase, a "V" phase and a "W" phase. In another embodiment, each winding set 61, 62, 63 defines five phases, i.e., the winding set defines a "U" phase, a "V" phase, an "X" phase, a "Y" phase and a "Z" phase. However, the electric machine 10 is not limited to a three or five phase machine, and the number of phases may differ from the phases described herein.

Referring to FIG. 4, each of the first, second and third winding sets 61, 62, 63 includes a different set of hairpins 24 connected in series. As shown in FIG. 4, the first, second and third winding sets 61, 62, 63 may be parallel to one another. The first, second and third winding sets 61, 62, 63 may also be connected in series relative to one another. Referring to FIG. 4, the first winding set 61 may be formed by hairpins 24 from the first and second hairpin layers 54A, B connected in series through a first jumper 64. For example, the first winding set 61 may include 12 hairpins from the first hairpin layer 54A connected in series with 12 hairpins from the second hairpin layer 54B.

Referring to FIG. 4, the second winding set 62 may be formed by hairpins 24 from the third and fourth hairpin layers 54C, D connected in series through a second jumper 66. For example, the second winding set may include 12 hairpins from the third hairpin layer 54C connected in series with 12 hairpins from the fourth hairpin layer 54D.

Referring to FIG. 4, the third winding set 63 may be formed by hairpins 24 from the fifth and sixth hairpin layers 54E, F, connected in series through a third jumper 68. For example, the third winding set 63 may include 12 hairpins from the fifth hairpin layer 54E connected in series with 12 hairpins from the sixth hairpin layer 54F.

Referring now to FIG. 1, a first set 70 of three adjacent slots of the stator slots 20 may be configured to accommodate the hairpins 24 carrying current with a first phase. For example, all of the first, second, third, fourth, fifth and sixth slot layers 22A-E in the 19$^{th}$, 20$^{th}$ and 21$^{st}$ stator slots (S19, S20, S21 shown in FIG. 2) may carry current with phase U. Referring to FIG. 1, a second set 72 of three adjacent slots of the stator slots 20 may be configured to accommodate the hairpins 24 carrying current with a second phase. For example, all of the first, second, third, fourth, fifth and sixth slot layers 22A-E in the 22$^{nd}$, 23$^{rd}$ and 24$^{th}$ stator slots (S22, S23, S24 shown in FIG. 2) may carry current with phase V. Referring to FIG. 1, a third set 74 of three adjacent slots of the stator slots 20 may be configured to accommodate the hairpins 24 carrying current with a third phase. For example, all of the first, second, third, fourth, fifth and sixth slot layers 22A-E in the 25$^{th}$, 26$^{th}$ and 27$^{th}$ stator slots (S25, S26, S27 shown in FIG. 2) may carry current with phase W.

In summary, for every three adjacent stator slots 20, all of the first, second, third, fourth, fifth and sixth slot layers 22A-E may include hairpins 24 carrying the same phase current. This pattern may be repeated for all the stator slots (numbered S1 through S72, see FIG. 5). Alternatively, the sets 70, 72, 74 may include only two adjacent slots or any other number of adjacent slots.

Figure 5:
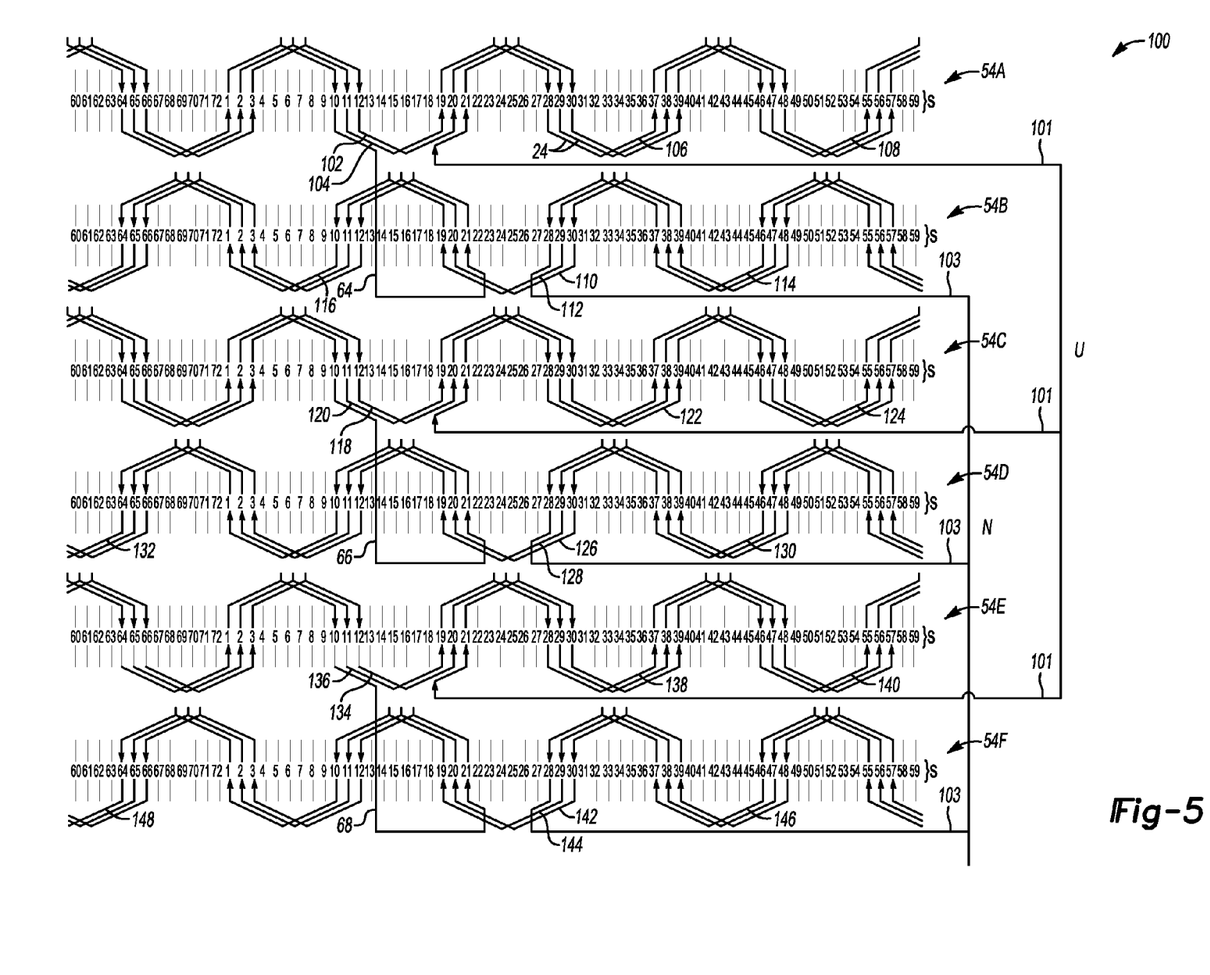
FIG. 5 is schematic wiring diagram for the stator assembly of FIG. 4.

FIG. 5 is a schematic diagram of a winding layout 100 for the first through sixth hairpin layers 54A-E, corresponding to the connections shown in FIG. 4. FIG. 5 represents a stator assembly 16 with 72 slots. The slot numbers are bracketed on the right by the letter "S" (such that numbers 1 through 72 refer to slots S1 through S72). FIG. 5 shows all the stator slots (S1-72) with the right side of the figure wrapping over or joining the left side of the figure. The letter "N" in FIGS. 4-5 refers to the neutral connection while U, V and W refer to the three phases. While the winding layout 100 in FIG. 5 is shown for phase U, the layouts for phases V and W are similar. Other alternative configurations may be made, for example, a "Y" configuration without a common neutral or a Delta connection, as known to those skilled in the art.

Referring to FIGS. 4-5, the entering lead 101 (from phase U) and exiting lead 103 (to neutral N) are shown. Referring to FIG. 5, the first hairpin layer 54A includes a first short-pitched coil 102 (spanning 8 slots, from slots S12 to S20) and a second short-pitched coil 104 (spanning 8 slots, from slots S11 to S19). The first hairpin layer 54A also includes multiple full-pitched coils 38 (shown in FIG. 3) such as first and second full-pitched coils 106, 108, each of which spans 9 slots.

Referring to FIG. 5, the second hairpin layer 54B includes a first long-pitched coil 110 (spanning 10 slots, from slots S30 to S20) and a second long-pitched coil 112 (spanning 10 slots, from slots S29 to S19). The second hairpin layer 54B also includes multiple full-pitched coils 38 (shown in FIG. 3) such as third and fourth full-pitched coils 114, 116 each of which spans 9 slots.

Referring to FIG. 5, the third hairpin layer 54C includes a third short-pitched coil 118 (spanning 8 slots, from slots S12 to S20) and a fourth short-pitched coil 120 (spanning 8 slots, from slots S11 to S19). The third hairpin layer 54C also includes multiple full-pitched coils 38 (shown in FIG. 3) such as fifth and sixth full-pitched coils 122, 124 each of which spans 9 slots.

Referring to FIG. 5, the fourth hairpin layer 54D includes a third long-pitched coil 126 (spanning 10 slots, from slots S30 to S20) and a fourth long-pitched coil 128 (spanning 10 slots, from slots S29 to S19). The fourth hairpin layer 54D also includes multiple full-pitched coils 38 (shown in FIG. 3) such as seventh and eighth full-pitched coils 130, 132 each of which spans 9 slots.

Referring to FIG. 5, the fifth hairpin layer 54E includes a fifth short-pitched coil 134 (spanning 8 slots, from slots S12 to S20) and a sixth short-pitched coil 136 (spanning 8 slots, from slots S11 to S19). The fifth hairpin layer 54E also includes multiple full-pitched coils 38 (shown in FIG. 3) such as ninth and tenth full-pitched coils 138, 140 each of which spans 9 slots.

Referring to FIG. 5, the sixth hairpin layer 54F includes a fifth long-pitched coil 142 (spanning 10 slots; from slots S30 to S20) and a sixth long-pitched coil 144 (spanning 10 slots; from slots S29 to S19). The sixth hairpin layer 54F also includes multiple full-pitched coils 38 (shown in FIG. 3) such as eleventh and twelfth full-pitched coils 146, 148 each of which spans 9 slots.

In summary, the winding layout 100 is such that: (a) the first, third and fifth hairpin layers 54A, C, E each include at least two short-pitched coils 34 (shown in FIG. 3); and (b) the second, fourth and sixth hairpin layers 54B, D, F each include at least two long-pitched coils 36 (shown in FIG. 3). Stated more broadly and as described above, the winding layout 100 is such that: (a) one of the first, second, third, fourth, fifth and sixth hairpin layers 54A-E includes at least one short-pitched coil 34; and (b) another of the first, second, third, fourth, fifth and sixth hairpin layers 54A-E includes at least one long-pitched coil 36. The first, second, third, fourth, fifth and sixth hairpin layers 54A-E each may include at least one full-pitched coil 38 (shown in FIG. 3). The winding layout 100 of FIG. 5 is configured for a three-slot distribution, as discussed above. A layout with fewer or more slot distributions (such as a two-slot distribution) may require correspondingly fewer or more short-pitched and long-pitched coils 34, 36.

The winding layout 100 described above and shown in FIG. 5 is configured to lower voltages between the respective hairpins 24 within each stator slot 20. Combining the use of short-pitched and long pitched coils 34, 36 within the same winding layout 100, in the manner shown in FIG. 5, leads to a reduction of voltages between the respective hairpins 24 within each stator slot 20. The winding layout 100 may lower the in-slot voltages between hairpins 24 by approximately 35%.

Referring to FIG. 2, slot liners 150 are generally inserted into each of the stator slots 20 to electrically isolate the hairpins 24 from one another to prevent phase to phase shorts from occurring. Lowering voltages between the respective hairpins 24 within each stator slot 20 allows for the elimination of hairpin-to-hairpin (or between conductor) slot liners 150. Thus the stator assembly 16 may be characterized by an absence of respective hairpin-to-hairpin slot liners 150 between the hairpins 24. This improves copper slot fill, lowers energy losses and improves the efficiency and life of the machine 10. However, it is to be appreciated that the winding layout 100 may be employed either with or without hairpin-to-hairpin slot liners.

The winding layout 100 outlined above and shown in FIG. 5 allows for greater flexibility in designing an electric machine 10 with a particular torque or system voltage requirement. Arbitrarily specifying a configuration for an electric machine 10 will not produce the required torque output or meet minimum noise requirements. Only specific configurations with a particular number of slots, number of phases, number of poles, number of winding sets, configuration of hairpin layers 54A-E (relative to the slot layers 22A-E) etc. will produce the desired functionality. These specific configurations cannot readily be determined by inspection. If a layout is not selected correctly, the design will either perform poorly or will not meet the functional requirements. Because of the large number of possible combinations, the workable configurations are neither easily determined nor obvious.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A stator assembly comprising:
a plurality of stator slots defining a plurality of slot layers;
a plurality of hairpins each having a respective first leg positioned in one of the plurality of slot layers and a respective second leg positioned in another of the plurality of slot layers, each of the plurality of hairpins being configured to allow a current to flow from the respective first leg to the respective second leg;
wherein each of the plurality of hairpins is one of a short-pitched coil, a long-pitched coil and a full-pitched coil;
wherein the short-pitched, long-pitched and full-pitched coils are configured to extend over a first, second and third number of the plurality of stator slots, respectively, the first number being less than the second number and the third number being between the first and second numbers;
wherein the plurality of hairpins is divided into a plurality of hairpin layers;
wherein one of the first, second, third, fourth, fifth and sixth hairpin layers includes at least one of the short-pitched coils;
wherein another of the first, second, third, fourth, fifth and sixth hairpin layers includes at least one of the long-pitched coils;
wherein the plurality of hairpin layers includes first, second, third, fourth, fifth and sixth hairpin layers and the plurality of slot layers includes first, second, third, fourth, fifth and sixth slot layers;
wherein the plurality of hairpins form first, second and third winding sets;
wherein the first winding set is formed from the plurality of hairpins in the first and second hairpin layers;
wherein the second winding set is formed from the plurality of hairpins in the third and fourth hairpin layers; and
wherein the third winding set is formed from the plurality of hairpins in the fifth and sixth hairpin layers.

2. The stator assembly of claim 1, wherein the assembly is characterized by an absence of respective hairpin-to-hairpin slot liners between the plurality of hairpins.

3. The stator assembly of claim 1, wherein:
a first set of three adjacent slots of the plurality of stator slots is configured to accommodate the plurality of hairpins carrying the current with a first phase;
a second set of three adjacent slots of the plurality of stator slots is configured to accommodate the plurality of hairpins carrying the current with a second phase; and
a third set of three adjacent slots of the plurality of stator slots is configured to accommodate the plurality of hairpins carrying the current with a third phase.

4. The stator assembly of claim 1, wherein:
the first hairpin layer is defined by the plurality of hairpins with the respective first leg in the first slot layer and the respective second leg in the second slot layer;
the second hairpin layer is defined by the plurality of hairpins with the respective first leg in the second slot layer and the respective second leg in the first slot layer;
the third hairpin layer is defined by the plurality of hairpins with the respective first leg in the third slot layer and the respective second leg in the fourth slot layer;
the fourth hairpin layer is defined by the plurality of hairpins with the respective first leg in the fourth slot layer and the respective second leg in the third slot layer;
the fifth hairpin layer is defined by the plurality of hairpins with the respective first leg in the fifth slot layer and the respective second leg in the sixth slot layer; and
the sixth hairpin layer is defined by the plurality of hairpins with the respective first leg in the sixth slot layer and the respective second leg in the fifth slot layer.

5. The stator assembly of claim 1, wherein:
the first, third and fifth hairpin layers each include at least two short-pitched coils; and
the second, fourth and sixth hairpin layers each include at least two long-pitched coils.

6. The stator assembly of claim 1, wherein the first, second, third, fourth, fifth and sixth hairpin layers each include at least one full-pitched coil extending over a third number of the plurality of stator slots, the third number being greater than the first number and less than the second number.

7. The stator assembly of claim 6, wherein the first, second and third numbers are 8, 10 and 9, respectively.

8. The stator assembly of claim 1, wherein:
the first winding set includes 12 of the plurality of hairpins from the first hairpin layer connected in series with 12 of the plurality of hairpins from the second hairpin layer;
the second winding set includes 12 of the plurality of hairpins from the third hairpin layer connected in series with 12 of the plurality of hairpins from the fourth hairpin layer; and
the third winding set includes 12 of the plurality of hairpins from the fifth hairpin layer connected in series with 12 of the plurality of hairpins from the sixth hairpin layer.

9. The stator assembly of claim 1, wherein each of the first, second and third winding sets defines an identical number of multiple phases; and the plurality of stator slots includes exactly 72 slots.

10. An electric machine comprising:
a stator assembly;
a rotor assembly rotatable relative to the stator assembly;
wherein the stator assembly includes:
a plurality of stator slots defining first, second, third, fourth, fifth and sixth slot layers;
a plurality of hairpins each having a respective first leg positioned in one of the first, second, third, fourth, fifth and sixth slot layers and a respective second leg positioned in another of the first, second, third, fourth, fifth and sixth slot layers;
wherein each of the plurality of hairpins is configured to allow a current to flow from the respective first leg to the respective second leg;
wherein each of the plurality of hairpins is one of a short-pitched coil, a long-pitched coil and a full-pitched coil;
wherein the short-pitched, long-pitched and full-pitched coils are configured to extend over a first, second and third number of the plurality of stator slots, respectively, the first number being less than the second number and the third number being between the first and second numbers;
wherein the plurality of hairpins is divided into first, second, third, fourth, fifth and sixth hairpin layers;
wherein the first, third and fifth hairpin layers each include at least two of the short-pitched coils; and
wherein the second, fourth and sixth hairpin layers each include at least two of the long-pitched coils;
wherein the first hairpin layer is defined by the plurality of hairpins with the respective first leg in the first slot layer and the respective second leg in the second slot layer;
wherein the second hairpin layer is defined by the plurality of hairpins with the respective first leg in the second slot layer and the respective second leg in the first slot layer;
wherein the third hairpin layer is defined by the plurality of hairpins with the respective first leg in the third slot layer and the respective second leg in the fourth slot layer;
wherein the fourth hairpin layer is defined by the plurality of hairpins with the respective first leg in the fourth slot layer and the respective second leg in the third slot layer;
wherein the fifth hairpin layer is defined by the plurality of hairpins with the respective first leg in the fifth slot layer and the respective second leg in the sixth slot layer; and
wherein the sixth hairpin layer is defined by the plurality of hairpins with the respective first leg in the sixth slot layer and the respective second leg in the fifth slot layer.

11. The machine of claim 10, wherein the first, second, third, fourth, fifth and sixth hairpin layers each include at least one of the full-pitched coils.

12. The machine of claim 10, wherein the first, second and third numbers are 8, 10 and 9, respectively.

13. The machine of claim 12, wherein the first, second and third numbers are 5, 7 and 6, respectively; and wherein the plurality of stator slots includes exactly 48 slots.

14. The machine of claim 10, wherein the assembly is characterized by an absence of respective hairpin-to-hairpin slot liners between the plurality of hairpins.

15. The machine of claim 10, wherein:
a first set of three adjacent slots of the plurality of stator slots is configured to accommodate the plurality of hairpins carrying the current with a first phase;
a second set of three adjacent slots of the plurality of stator slots is configured to accommodate the plurality of hairpins carrying the current with a second phase; and
a third set of three adjacent slots of the plurality of stator slots is configured to accommodate the plurality of hairpins carrying the current with a third phase.

16. An electric machine comprising:
a stator assembly;
a rotor assembly rotatable relative to the stator assembly;
wherein the stator assembly includes:
a plurality of stator slots defining first, second, third, fourth, fifth and sixth slot layers;
a plurality of hairpins each having a respective first leg positioned in one of the first, second, third, fourth, fifth and sixth slot layers and a respective second leg positioned in another of the first, second, third, fourth, fifth and sixth slot layers;

wherein each of the plurality of hairpins is configured to allow a current to flow from the respective first leg to the respective second leg;

wherein the plurality of hairpins is divided into first, second, third, fourth, fifth and sixth hairpin layers;

wherein the plurality of hairpins form first, second and third winding sets, each of the first, second and third winding sets being parallel to one another;

wherein the first winding set is formed from the plurality of hairpins in the first and second hairpin layers;

wherein the second winding set is formed from the plurality of hairpins in the third and fourth hairpin layers;

wherein the third winding set is formed from the plurality of hairpins in the fifth and sixth hairpin layers;

wherein the first, third and fifth hairpin layers each include at least two short-pitched coils configured to extend over a first number of the plurality of stator slots; and wherein the second, fourth and sixth hairpin layers each include at least two long-pitched coils configured to extend over a second number of the plurality of stator slots; the second number being greater than the first number.

* * * * *